(12) United States Patent
Norman et al.

(10) Patent No.: US 8,772,204 B2
(45) Date of Patent: Jul. 8, 2014

(54) FLUOROSURFACTANTS AND TREATMENT FLUIDS FOR REDUCTION OF WATER BLOCKS, OIL BLOCKS, AND/OR GAS CONDENSATES AND ASSOCIATED METHODS

(75) Inventors: Lewis R. Norman, Duncan, OK (US); Rajesh K. Saini, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/417,020

(22) Filed: Mar. 9, 2012

(65) Prior Publication Data

US 2012/0172262 A1 Jul. 5, 2012

Related U.S. Application Data

(62) Division of application No. 12/553,764, filed on Sep. 3, 2009, now Pat. No. 8,669,212.

(51) Int. Cl.
*C09K 8/60* (2006.01)
*C09K 8/035* (2006.01)
*C09K 8/78* (2006.01)
*C09K 8/52* (2006.01)
*C09K 8/68* (2006.01)

(52) U.S. Cl.
CPC . *C09K 8/52* (2013.01); *C09K 8/604* (2013.01); *C09K 8/035* (2013.01); *C09K 8/602* (2013.01); *C09K 8/78* (2013.01); *C09K 8/68* (2013.01)
USPC ........... 507/205; 507/240; 507/244; 507/255; 507/259; 507/261; 507/265; 507/269; 166/305.1

(58) Field of Classification Search
None
See application file for complete search history.

(56) References Cited

U.S. PATENT DOCUMENTS

| 2,194,906 | A | | 3/1940 | Hans et al. | |
|---|---|---|---|---|---|
| 4,014,926 | A | * | 3/1977 | Dear et al. | 562/105 |
| 4,565,639 | A | | 1/1986 | Penny et al. | |
| 4,702,849 | A | | 10/1987 | Penny | |
| 4,975,208 | A | * | 12/1990 | Watkins | 507/202 |

(Continued)

FOREIGN PATENT DOCUMENTS

| WO | 96/06603 A1 | 3/1996 |
|---|---|---|
| WO | WO 03074833 A2 | 9/2003 |
| WO | 2007/056284 A2 | 5/2007 |

OTHER PUBLICATIONS

USPTO Notice of Allowance for U.S. Appl. No. 12/553,764 dated Jul. 26, 2013.

(Continued)

*Primary Examiner* — John J Figueroa
(74) *Attorney, Agent, or Firm* — Craig W. Roddy; Tumey L.L.P.

(57) ABSTRACT

The present invention relates to fluids useful for subterranean operations, and more particularly, to fluorosurfactants useful for the reduction of water blocks, gas blocks, and/or gas condensates and their associated treatment fluids and methods. Provided is a method of treating a subterranean formation. The Method may comprise contacting the subterranean formation with a fluorosurfactant. The fluorosurfactant may comprise an amine group, wherein the amine group comprises at least one substituent selected from the group consisting of a fluoroalkyl group, a fluoroalkenyl group, and combinations thereof, wherein the at least one substituent comprises about 3 carbons to about 22 carbons. Also provided are polymeric surfactants and treatment fluids that comprise fluorosurfactants.

20 Claims, 2 Drawing Sheets

(56) References Cited

U.S. PATENT DOCUMENTS

| | | | |
|---|---|---|---|
| 5,196,135 | A | 3/1993 | Merianos |
| 5,310,002 | A | 5/1994 | Blauch et al. |
| 6,729,408 | B2 | 5/2004 | Hinkel et al. |
| 6,929,069 | B2 | 8/2005 | Hinkel et al. |
| 6,972,274 | B1 | 12/2005 | Slikta et al. |
| 7,380,606 | B2 | 6/2008 | Pursley et al. |
| 7,772,162 | B2 | 8/2010 | Pope et al. |
| 2004/0067855 | A1 | 4/2004 | Hughes et al. |
| 2007/0029085 | A1 | 2/2007 | Panga et al. |
| 2007/0079965 | A1 | 4/2007 | Nguyen et al. |
| 2008/0173451 | A1 | 7/2008 | Reddy et al. |
| 2009/0253595 | A1* | 10/2009 | Qu et al. ............ 507/244 |
| 2010/0285999 | A1 | 11/2010 | Norman et al. |

OTHER PUBLICATIONS

PCT International Preliminary Report and Written Opinion for International Application No. PCT/GB2010/000575 dated Nov. 9, 2011.

USPTO Office Action for U.S. Appl. No. 12/553,764 dated Sep. 13, 2012.

USPTO Office Action for U.S. Appl. No. 12/553,764 dated Mar. 28, 2013.

USPTO Office Action for U.S. Appl. No. 12/553,764 dated Feb. 17, 2012.

SPE Paper No. 82214, "New Environmentally Friendly Surfactant Enhances Well Cleanup," by Jerald J. Hinkel et al., May 2003.

Halliburton brochure entitled "GasPerm 1000 Service," Apr. 2008.

\* cited by examiner

FLUOROSURFACTANTS AND TREATMENT FLUIDS FOR REDUCTION OF WATER BLOCKS, OIL BLOCKS, AND/OR GAS CONDENSATES AND ASSOCIATED METHODS

CROSS-REFERENCE TO RELATED APPLICATIONS

The present application is a divisional of U.S. patent application Ser. No. 12/553,764, entitled "Fluorosurfactants and Treatment Fluids for Reduction of Water Blocks and/or Gas Condensates and Associated Methods," filed on Sep. 3, 2009, the entire disclose of which is incorporated herein by reference.

BACKGROUND

The present invention relates to fluids useful for subterranean operations, and more particularly, in one or more embodiments, to fluorosurfactants useful for the reduction of water blocks, gas blocks, and/or gas condensates and their associated treatment fluids and methods.

Various procedures have been developed and utilized that may increase the flow of hydrocarbons from hydrocarbon-containing subterranean formations penetrated by well bores. For example, a conventional production stimulation technique may involve creating and extending fractures in the subterranean formation to provide flow channels therein through which hydrocarbons flow from the formation to the well bore. The fractures may be created by introducing a fracturing fluid into the formation at a rate sufficient to exert a sufficient pressure on the formation to create and extend fractures therein. Solid fracture proppant materials, such as sand, may be suspended in the fracturing fluid so that upon introducing the fracturing fluid into the formation and creating and extending fractures therein, the proppant material may be carried into the fractures and deposited therein. Such a treatment may prevent the fractures from closing due to subterranean forces when the introduction of the fracturing fluid has ceased.

Water-based fluids may be used to fracture a subterranean formation, and when treated with conventional surfactants to recover the fracturing fluid, typically only a small portion of the fracturing fluid can be recovered. The aqueous fluid retained in the formation may increase the water-saturation level of the formation, adversely affecting, among other things, the relative permeability to hydrocarbon flow, effective flow area, fracture length and the well productivity. The water-saturation levels of the formation may also increase due to, among other things, cross flow from water-bearing zones or other regions of the formation and filtrate invasion from water-based drilling fluids. In the latter case, the water saturation level of the formation near the well bore may be especially high, which may lower the relative permeability of the formation and thus the production of hydrocarbons by water-block formation.

In gas wells, in addition to these sorts of water blocks, liquid hydrocarbons may accumulate and lower the permeability of the formation rocks. Moreover, liquid hydrocarbons that condense out of the gas phase due to the decline in pressure below the dew point pressure of the gas also may hinder the production of hydrocarbons. Commercially available fluid treatments for the reduction of water blocks, oil blocks, and/or gas condensates such as amine oxides may not be satisfactory, for example, because of their limited temperature range usability. Others may not be optimal because of the high cost associated with their use.

Several conventional surfactants have been used in attempts to alleviate these problems. Surfactants, which contain a hydrophilic and a hydrophobic group, are mixed with a treatment fluid, for example, to lower the surface tension of the fluid in order to facilitate the cleanup and mitigate formation damage caused by either water blocks, oil blocks, or gas condensates. In addition to lowering surface tension, surfactants also may change the formation wettability. This results from a decrease in the capillary pressure of the flow channels in the subterranean formation, which may be accomplished by, among other things, changing the contact angle so that clean-up process is facilitated, and the hydrocarbons can flow with less resistance.

Cationic, anionic and zwitterionic surfactants may be used to enhance the production of hydrocarbons. Chemical systems other than surfactants used to accomplish the same objective may include finely dispersed emulsions. In recent years, use of these emulsions to improve gas productivity has been gradually increasing.

SUMMARY

The present invention relates to fluids useful for subterranean operations, and more particularly, in one or more embodiments, to fluorosurfactants useful for the reduction of water blocks, gas blocks, and/or gas condensates and their associated treatment fluids and methods.

An embodiment of the present invention provides a method of treating a subterranean formation. The method may comprise contacting the subterranean formation with a fluorosurfactant. The fluorosurfactant may comprise an amine group, wherein the amine group comprises at least one substituent comprising about 3 carbons to about 22 carbons and selected from the group consisting of a fluoroalkyl group, a fluoroalkenyl group, and combinations thereof.

An embodiment of the present invention provides a treatment fluid. The treatment fluid may comprise a carrier fluid and a fluorosurfactant. The fluorosurfactant may comprise an amine group, wherein the amine group comprises at least one substituent comprising about 3 carbons to about 22 carbons and selected from the group consisting of a fluoroalkyl group, a fluoroalkenyl group.

An embodiment of the present invention provides a polymeric fluorosurfactant comprising repeating nitrogens that comprise at least one substituent selected from the group consisting of a fluoroalkyl group, a fluoroalkenyl group, and combinations thereof, wherein the at least one substituent comprises about 3 carbons to about 22 carbons.

Other features and advantages of the present invention will be readily apparent to those skilled in the art upon a reading of the description of preferred embodiments which follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
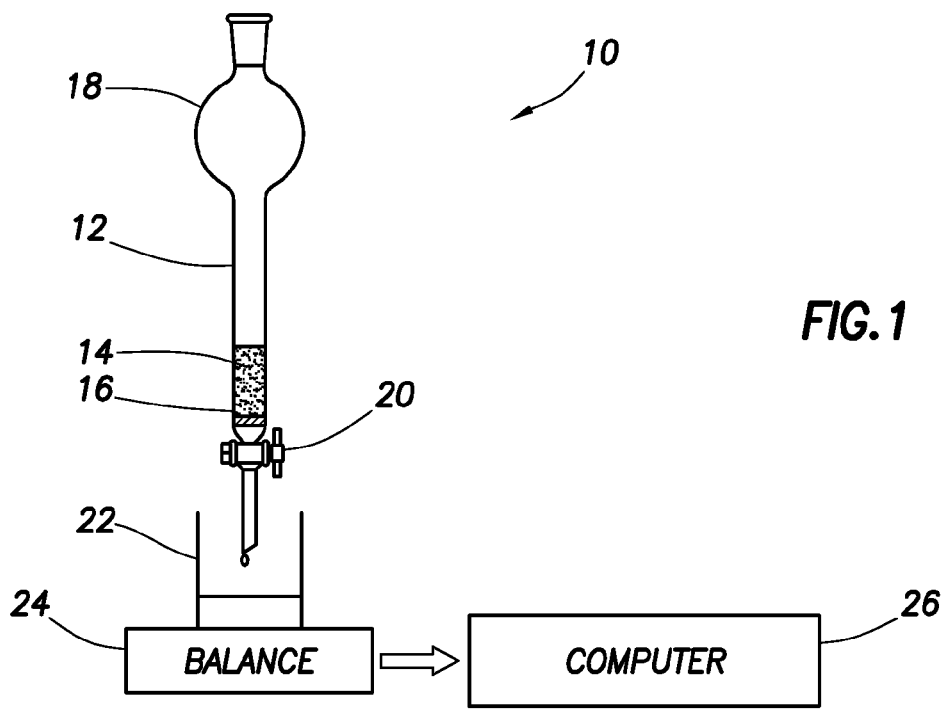
FIG. 1 is a diagram of a vertical glass column used for the Examples.

The present invention relates to fluids useful for subterranean operations, and more particularly, in one or more embodiments, to fluorosurfactants useful for the reduction of water blocks, gas blocks, and/or gas condensates and their associated treatment fluids and methods. As will be appreciated by those of ordinary skill in the art, embodiments of the present invention may be used in any subterranean formation containing natural gas. This gas, for example, may be compressed gas contained within formation pores and/or gas that is adsorbed onto surfaces within the formation. By way of example, the techniques described herein may be used to treat coal beds to improve the recovery of natural gas found therein. Those of ordinary skill in the art will appreciate that gas found in coal beds is commonly referred to as "coal bed methane."

In accordance with certain embodiments of the present invention, the fluorosurfactants generally comprise an amine group containing a fluoroalkyl group, fluralkenyl group, or a combination thereof that comprises about 3 carbons to about 22 carbons. In certain embodiments, the fluoroalkyl group or fluoralkenyl group may comprise about 3 carbons to about 22 carbons. In certain embodiments, the amine group may be positively charged. The amine group present on embodiments of the fluorosurfactant can be a primary, secondary, tertiary or quaternary nitrogen. It should be understood that the term fluoroalkyl groups can refer to both fluoroalkyl and perfluoroalkyl groups. In accordance with embodiments of the present invention, the fluorosurfactants may be polymeric surfactants. By way of example, embodiments of the fluorosurfactants may be polymeric surfactants that comprise repeating nitrogens substituted with a fluoroalkyl group, fluoralkenyl group, or a combination thereof that comprises about 3 carbons to about 22 carbons.

Embodiments of the fluorosurfactants should have multiple charged or uncharged groups that bind to the formation at multiple sites and should be very difficult to wash away in produced water or gas. The number of long chain alkyl groups on the fluorosurfactant should be selected in such a way so that the desired balance between hydrophobic and hydrophilic part is obtained so that it allows water and oil/gas to pass through a porous medium with minimum obstruction. Additionally, the fluorosurfactant may improve oil and/or gas production by reducing the occurrence of water blocks and/or gas condensates in the treated portion of the formation. Without being limited by theory, once introduced into the formation, the fluorosurfactant is believed to adsorb onto rock surfaces in the treated portion of the formation. Once adsorbed, it is believed that the fluorosurfactants may increase the contact angle between water and formation surfaces. By way of example, it believed that the contact angle may be increased from less than 90° to an angle of about 90°. This may directly or indirectly lead to reduced capillary pressure in the porosity of the formation. Reduced capillary pressure may lead to increased water-flow rates. As will be appreciated, improved water-flow rates should allow a reduction in existing water blocks and/or oil blocks, as well as a reduction in the formation of water and/or oil blocks. As such, it is believed that treatment of the formation with the fluorosurfactants may reduce the formation of water and/or oil blocks in the treated portion.

Figure 2:
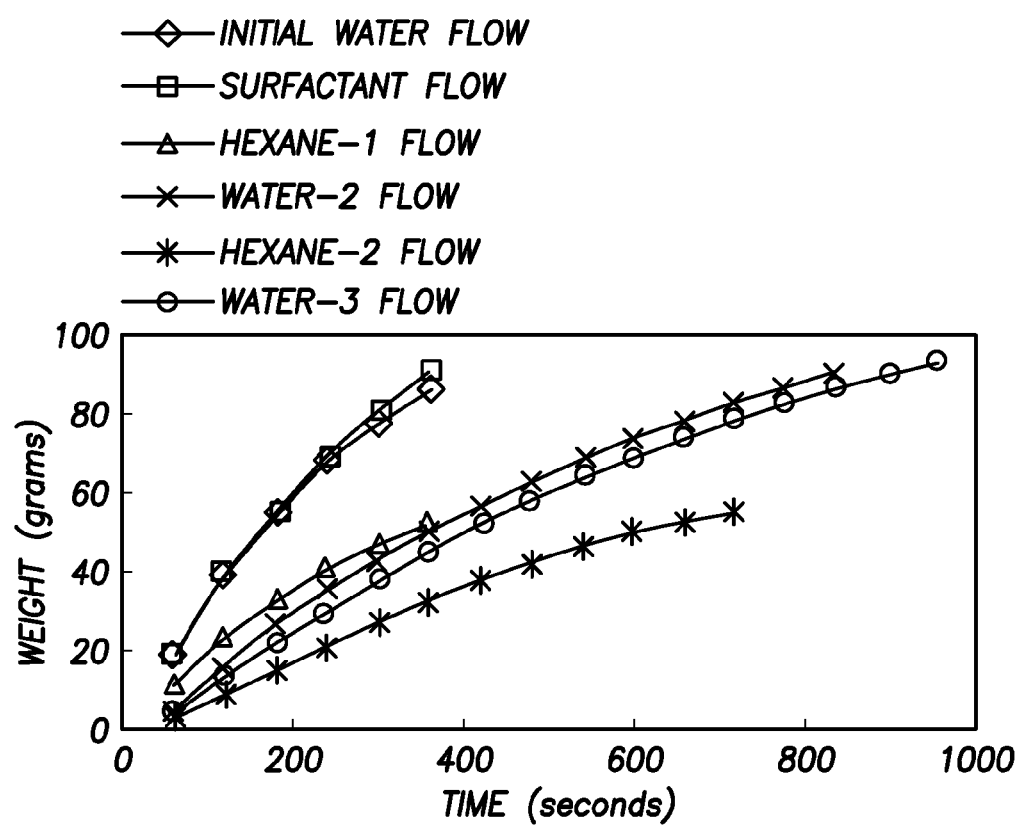
FIGS. 2 and 3 show plots of flow rate of various fluids through a vertical column of sand.
Figure 3:
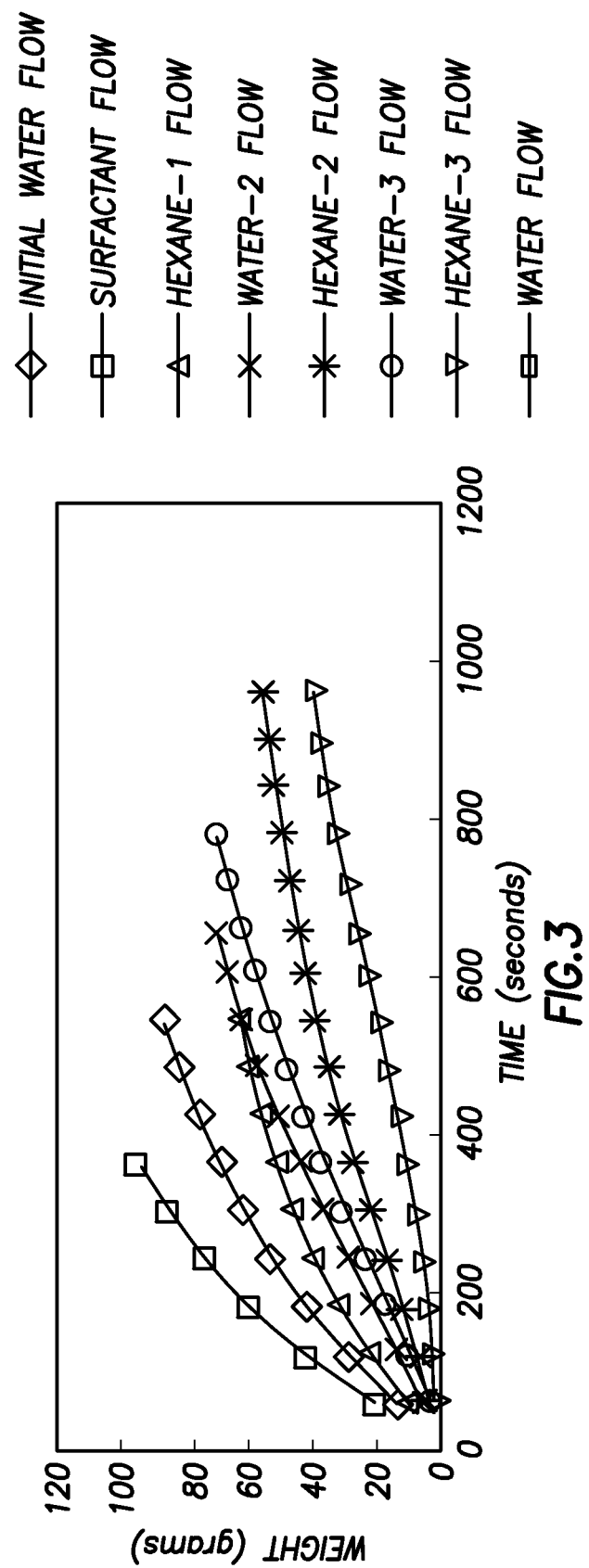

The potential effect of a surfactant as to its ability to reduce the occurrence of water blocks, oil blocks, and/or gas condensates in a treated portion of the formation can be examined by measuring the flow rate of fluids in a sand pack column after treatment with the surfactant. By way of example, FIGS. 2 and 3 illustrate the flow of fluids through a sand pack after the sand pack has been treated with a fluorosurfactant discussed herein. It has been discovered that, without treatment with the fluorosurfactant, the water will pass through the column but an oil-based fluid (e.g., hexane) would not pass though the sand column under the conditions described below in the Examples portion of this application. As illustrated by the hexane flows in FIGS. 2 and 3, the oil-based fluid does flow through the sand column after treatment with the surfactant solution. Additionally, the flow of water can be examined by comparing the initial water flow rate (Initial Water Flow) in FIGS. 2 and 3 through the column as compared to the second water flow rate (Water-2 Flow) in the column. Although the second water flow rate is slightly lower than the first, this multipassing of fluids suggests that the fluorosurfactants of the present invention would be successful in removing water blocks, oil blocks, and/or gas condensates.

In certain embodiments, the fluorosurfactants of the present invention may be a surfactant of the following general formula:

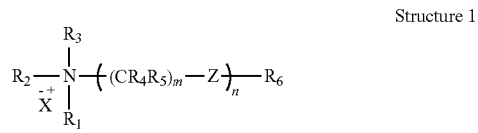

Structure 1

Wherein:

$R_1$ is a hydrogen atom, an alkyl group comprising about 1 to about 8 carbon atoms, or a fluoroalkyl group;

$R_2$ is a hydrogen atom, an alkyl group comprising about 1 to about 8 carbon atoms, or a fluoroalkyl group comprising about 1 to about 8 carbon atoms;

$R_3$ is a fluoroalkyl group or a fluoroalkenyl group, branched or unbranched, comprising about 3 to about 22 carbon atoms;

$R_4$ is a hydrogen atom, an alkyl group comprising about 1 to about 8 carbon atoms, or a fluoroalkyl group comprising about 1 to about 8 carbon atoms;

$R_5$ is a hydrogen atom, an alkyl group comprising about 1 to about 8 carbon atoms, or a fluoroalkyl group comprising about 1 to about 8 carbon atoms;

$R_6$ is a hydrogen atom, an alkyl group comprising about 1 to about 8 carbon atoms, a fluoroalkyl group comprising about 1 to about 8 carbon atoms, or —$(CR_4R_5)_m$—$N^+R_1R_2R_3.X^-$;

m is about 3 to about 8;

Z is either O, NH or S;

n is about 1 to about 6; and $X^-$ is an anion such Cl, Br, I, tosylate, mesylate, sulfate etc.

It should be understood that, in Structure 1, $R_1$ and $R_2$ may be the same or different groups in accordance with embodiments of the present invention. In addition, it should further be understood that $R_4$ and $R_5$ may be the same or different groups. Moreover, it should further be understood that, when multiple $R_1$'s, $R_2$'s, $R_3$'s, $R_4$'s, $R_5$'s, and/or $R_6$'s are present in a single surfactant molecule, the $R_1$'s, $R_2$'s, $R_3$'s, $R_4$'s, $R_5$'s, and/or $R_6$'s present in that the surfactant molecule may individually be any one of the items listed above. For example, if an embodiment of Structure 1 contains two $R_1$'s, then one $R_1$ may be a hydrogen atom and the other $R_1$ may be an alkyl group comprising about 1 to about 8 carbon atoms.

In certain embodiments, the fluorosurfactants of the present invention may be a surfactant of the following general formula:

Structure 2

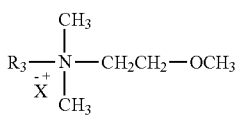

Wherein:
$R_3$ is an fluoroalkyl group that is either saturated or unsaturated comprising about 3 to about 12 carbon atoms; and $X^-$ is an anion.

As set forth above, embodiments of the fluorosurfactants of the present invention include polymeric surfactants. In certain embodiments, the fluorosurfactants may be a polymeric surfactant that comprises repeating nitrogens substituted with a fluoroalkyl group, fluoralkenyl group, or a combination thereof that comprises about 3 carbons to about 22 carbons. Moreover, in certain embodiments, the fluorosurfactants of the present invention may be a polymeric surfactant of the following general formula:

Structure 3

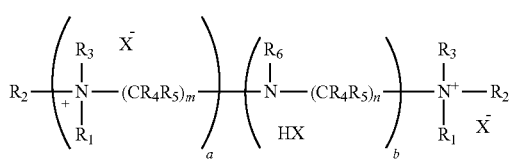

Wherein:
$R_1$ is a hydrogen atom, an alkyl group comprising about 1 to about 8 carbon atoms, a fluoroalkyl group comprising about 1 to about 8 carbon atoms, end-capped ethylene oxide (e.g., methyl-capped ethylene oxide, ethyl-capped ethylene oxide, propyl-capped ethylene oxide, butyl-capped ethylene oxide, etc.), or end-capped propylene oxide (e.g., methyl-capped ethylene oxide, ethyl-capped ethylene oxide, propyl-capped ethylene oxide, butyl-capped ethylene oxide, etc.);
$R_2$ is a hydrogen atom, an alkyl group comprising about 1 to about 8 carbon atoms, end capped ethylene oxide (e.g., methyl-capped ethylene oxide, ethyl-capped ethylene oxide, propyl-capped ethylene oxide, butyl-capped ethylene oxide, etc.), or end-capped propylene oxide (e.g., methyl-capped ethylene oxide, ethyl-capped ethylene oxide, propyl-capped ethylene oxide, butyl-capped ethylene oxide, etc.);
$R_3$ is a fluoroalkyl group or a fluoroalkenyl group, branched or unbranched, comprising about 3 to about 22 carbon atoms;
$R_4$ is a hydrogen atom, an alkyl group comprising about 1 to about 8 carbon atoms, or a fluoroalkyl group comprising about 1 to 8 carbon atoms;
$R_5$ is a hydrogen atom, an alkyl group comprising about 1 to about 8 carbon atoms, or a fluoroalkyl group comprising about 1 to 8 carbon atoms;
$R_6$ is a hydrogen atom, an alkyl group comprising about 1 to about 8 carbon atoms, a fluoroalkyl group comprising about 3 to about 22 carbon atoms, or $-(CR_4R_5)_m-N^+R_1R_2R_3.X^-$;
m is about 1 to about 6;
n is about 1 to about 6;
a and b are individually from about 1 to about 200, wherein the ratio of a to b is from about 1:4 to about 4:1; and
$X^-$ is an anion such as such Cl, Br, I, tosylate, mesylate, sulfate etc.

In accordance with embodiments of the present invention, Structure 3 may be linear or branched. It should be understood that, the polymeric surfactant of Structure 3 may be a block or random polymer in embodiments of the present invention. It should further be understood that, in Structure 3, $R_4$ and $R_5$ may be the same or different groups in accordance with embodiments of the present invention. Moreover, it should further be understood that, when multiple $R_1$'s, $R_2$'s, $R_3$'s, $R_5$'s, and/or $R_6$'s are present in a polymeric surfactant, the $R_1$'s, $R_2$'s, $R_3$'s, $R_4$'s, $R_5$'s, and/or $R_6$'s present in that surfactant may individual be any one of the items listed above. For example, if an embodiment of Structure 3 contains two $R_1$'s, then one $R_1$ may be a hydrogen atom and the other $R_1$ may be an alkyl group comprising about 1 to about 8 carbon atoms.

Embodiments of the fluorosurfactants may be highly soluble in water as well as in organic solvents and, thus, may he used in both solvents. Examples of suitable organic solvents include, but are not limited to alcohols (e.g., methanol, ethanol, isopropanol, propanol, or butanol), glycols (e.g., ethylene glycol or propylene glycol), glycol ethers (e.g., ethylene glycol monobutyl ether), diesel, mineral oil, paraffin oil, synthetic oils, hydrocarbons, alpha olefin, isomerized tetradecene, isomerized paraffin, or mixtures thereof. Those of ordinary skill in the art, with the benefit of this disclosure, will recognize other solvents that may be suitable for use.

Embodiments of the fluorosurfactants may also be relatively easy to synthesize. Example fluorosurfactants in accordance with embodiments of the present invention may be synthesized using a variety of techniques. In one embodiment, a suitable fluorosurfactant may be synthesized by reacting polyethylene imine (PEI) with a perfluoroalkyl halide (e.g., perfluorobutylethyl iodide). The synthesis may occur, in certain embodiments, with about 5 to about 10 mole equivalents of perfluorobutylethyl iodide with respect to PEI. The synthesis may be performed either in presence of solvents or without any solvent, as desired. The example fluorosurfactant synthesized in accordance with this technique can be used for the prevention of water and oil blocks. The surfactant further can he reacted with alkylhalides or other materials to quarternize nitrogen.

An embodiment of the present invention includes a treatment fluid comprising a fluorosurfactant. More particularly, for example, the fluorosurfactant may be dispersed and/or dissolved in a suitable carrier fluid that may be used in the treatment of a subterranean formation. Examples of suitable carrier fluids include any of a variety of carrier fluids that may be used in subterranean treatments, including aqueous- or hydrocarbon-based carrier fluids.

Sufficient concentrations of a suitable fluorosurfactant may be present in embodiments of the treatment fluids to provide a desired effect. The amount of the fluorosurfactant to include in the treatment fluid depends on a number of factors including, but not limited to, the composition and the porosity of the subterranean formation. In some embodiments, the fluorosurfactant may be present in a treatment fluid of the present invention in an amount in the range of about 0.01% to about 10% by weight of the treatment fluid. In some embodiments, the fluorosurfactant may be present in an amount in the range of about 0.05% to about 0.5% by weight of the treatment fluid. In certain embodiments of the present invention, the fluorosurfactant may be provided in a concentrated solution prior to its combination with the other components necessary to form a treatment fluid of the present invention.

One or more non-fluoro surfactants may also be used in combination with embodiments of the fluorosurfactants, as desired by those of ordinary skill in the art in accordance with embodiments of the present invention. For example, one or more non-fluoro surfactants may be used in combination with the embodiment of the fluorosurfactant of Structure 1. In certain embodiments, the treatment fluids may further comprise a non-fluoro surfactant. The non-fluoro surfactant generally should be a non-fluoro surfactant that may improve oil and/or gas production by reducing the occurrence of water blocks and/or gas condensates in the treated portion of the formation. Examples of suitable non-fluoro surfactants include, but are not limited to, any of a variety of anionic, cationic, and amphoteric surfactants. Where present, the non-fluoro surfactant may be used in various amounts, including, for example, a ratio of the fluorosurfactant to the additional surfactant of from about 1:99 to about 99:1. In certain embodiments, a fluorosurfactant of Structure I and a non-fluoro quaternary surfactant may be used in a ratio of about 50:50. It should be understood that a mixture of a cationic surfactant (e.g., a cationic fluorosurfactant of Structure 1) and an anionic surfactant may absorb onto the formation, thereby potentially reducing the occurrence of gas blocks and/or gas condensates in the treated portion of the formation, depending, for example, on the charge of the rock surface. The addition of the non-fluoro surfactant may also provide cost advantage over the fluorosurfactants.

In some embodiments, other additives may optionally be included in the treatment fluids of the present invention. Examples of such additives may include, but are not limited to, proppant particulates, gravel particulates, gelling agents, crosslinking agents, salts, additional surfactants (e.g., non-ionic surfactants), fluid loss control additives, acids, gases (e.g., nitrogen, carbon dioxide), surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, wetting agents, and coating enhancement agents. A person of ordinary skill in the art, with the benefit of this disclosure, will recognize when such optional additives should be included in a treatment fluid used in the present invention, as well as the appropriate amounts of those additives to include.

In accordance with embodiments of the present invention, embodiments of the fluorosurfactants may be used for the reduction of water blocks, gas blocks, and/or gas condensates. By way of example, a subterranean formation may be contacted with a fluorosurfactant for example, to improve the recovery of gas and/or hydrocarbons from the subterranean formation. The fluorosurfactants may contact the formation by introducing a treatment fluid comprising the fluorosurfactant into the subterranean formation. This may be accomplished, for example, by pumping the treatment fluid down a well bore that penetrates the subterranean formation. In certain embodiments, the treatment fluid may be introduced into the subterranean formation as a remedial treatment for the reduction of existing water blocks, oil blocks, and/or gas condensates. A remedial treatment is a treatment that is used to treat existing water blocks, oil blocks, and/or gas condensates, or other issues present in the subterranean environment. It is believed that the presence of the fluorosurfactants in the subterranean formation should also reduce the subsequent formation of water blocks, oil blocks, and/or gas condensates in the formation.

In addition, the treatment fluids and methods of the present invention may be useful in other operations performed in subterranean formations. By way of example, it may beneficial to include a fluorosurfactant in a fluid used in another operation so that, in addition to the desired operation, the fluorosurfactant may also reduce water blocks, oil blocks, and/or gas condensates in the formation. Such operations include, but are not limited to, fracturing, drilling, acidizing, and other workover operations. For example, it may be desirable to include the fluorosurfactant in a fluid used in fracturing, drilling, or acidizing to reduce water blocks, oil blocks, and/or gas condensates that may invade the production zone. One of ordinary skill in the art, with the benefit of the present disclosure, will recognize suitable operations in which embodiments of the fluorosurfactant may be used.

In certain embodiments, the fluorosurfactant may be used in fracturing operations in a subterranean formation. In these embodiments, a fracturing fluid comprising a fluorosurfactant may be pumped into a well bore that penetrates a subterranean formation at or above formation fracture pressure. In addition to the fluorosurfactants, fracturing fluids further may comprise proppant particulates that may be deposited in the fractures. The proppant particulates may function, for example, to prevent one or more of fractures creature during the operation from fully closing upon the release of hydraulic pressure, forming conductive channels through which fluids may flow to the well bore. Once at least one fracture is created and the proppant particulates are substantially in place, the viscosity of the fracturing fluid may be reduced (e.g., through the use of a gel breaker, or allowed to reduce naturally over time) to allow it to be recovered.

In certain embodiments, the fluorosurfactant may be used in drilling operations in a subterranean formation. In certain embodiments, such drilling operations may include drilling a well bore into a subterranean formation. A drilling fluid comprising a fluorosurfactant may be circulated in the well bore during the drilling operation. Drilling the well bore may he accomplished by using drilling equipment, such as a drill string and a drill bit, along with the drilling fluid. Drilling operations may include any suitable technique for forming a well bore that penetrates a subterranean formation. Examples of suitable techniques for forming a well bore may include, but are not limited to, rotary drilling and cable-tool drilling. Other techniques for forming a well bore may be used, but generally to a lesser extent. Rotary drilling operations typically involve attaching a drill bit on a lower end of a drill string to form a drilling tool and rotating the drill bit along with the drill string into a subterranean formation to create a well bore through which subsurface formation fluids may be produced. As the drill bit penetrates the subterranean formation, additional joints of pipe may be coupled to the drill string. In another method of drilling, coiled tubing may be used instead of jointed pipe and the drill bit may be rotated using a downhole motor.

In certain embodiments, the fluorosurfactant may be used in acidizing and/or acid-fracturing operations. In these embodiments, a portion of the subterranean formation is contacted with an acidizing fluid that comprises a fluorosurfactant. The acidizing fluid generally further comprises an acid (or salt thereof) that interacts with subterranean formation to form "voids" (e.g., cracks, fractures, wormholes, etc.) in the formation. After acidization is completed, the acidizing fluid (or some portion thereof) may he recovered to the surface. The remaining voids in the subterranean formation may, for example, enhance the formation's permeability, and/or increase the rate at which fluids subsequently may be produced from the formation. In certain embodiments, the acidizing fluid may be introduced into the subterranean formation at or above formation fracture pressure. In other embodiments, the acidizing fluid may be introduced into the subterranean formation below formation fracture pressure.

To facilitate a better understanding of the present invention, the following examples of the preferred embodiments are given: In no way should the following examples be read to limit, or define, the scope of the invention.

EXAMPLES

Synthesis of Fluorosurfactants

Fluorosurfactants that may be useful in embodiments of the present invention were synthesized. More particularly, two PEI-based fluorosurfactants were synthesized by the reaction of PEI with 5- and 10-mole equivalents of perfluorobutylethyl iodide as described below. The fluorosurfactant with 5 and 10 perfluorobutylethyl chains are designated as Fluorosurfactants Nos. 1 and 2, respectively, in the following text.

Fluorosurfactant No. 1: Oligomeric PEI (Mw 423, 6 g, 14.18 mmol, available from Aldrich), perfluorobutylethyl iodide (26.52 g, 71.1 mmol), and chloroform/methanol (50 ml, 1:1 mixture) were placed in a 250 ml round bottom flask equipped with a condenser. The contents were refluxed while stirring in an oil bath maintained at 85° C. for 24 hours. The volatiles were removed under vacuum to obtain a viscous brownish oil, the fluorosurfactant. The fluorosurfactant was used without any further purification. The reaction scheme for the synthesis of this fluorosurfactant is provided below.

Table 1 below shows the contact angle measurements for Fluorosurfactants Nos. 1 and 2. As indicated in the table below, Fluorosurfactant No. 1 provides a higher contact angle than Fluorosurfactant No. 2. Both Fluorosurfactants Nos. 1 and 2 provide a higher contact angle than the drop of water on the glass slide without treatment. There was no contact angle on the untreated slide as the drop of water wetted the surface.

TABLE 1

| Test | Contact Angle ($\theta$) |
|---|---|
| Fluorosurfactant No. 1 | 68.39 |
| Fluorosurfactant No. 2 | 76.24 |
| No Treatment | Wet the slide |

Vertical Sand Column Experiments

An illustration of the apparatus 10 used to perform the vertical sand column experiments is shown in FIG. 1. Apparatus 10 includes glass tube 12 having a total length of approximately 21 inches and an internal diameter of approximately 19 mm. Glass tube 12 is packed with a column 14 of sand. A frit 16 is located at the bottom of glass tube 12 to retain the sand. The top of glass tube 12 includes bulb 18 having a volume of about 400 mls. The fluid exit from the glass tube 12 is controlled by drainage stopcock 20. Fluid

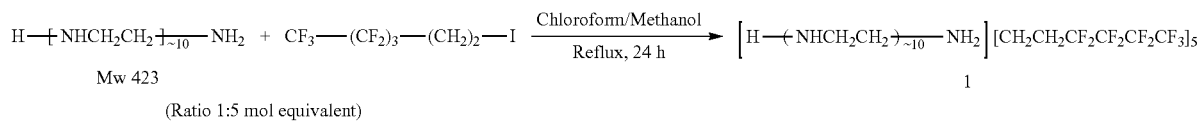

(Ratio 1:5 mol equivalent)

Fluorosurfactant No. 2: Oligomeric PEI (Mw 423, 3 g, 7.09 mmol, available from Aldrich), perfluorobutylethyl iodide (26.52 g, 71.1 mmol), and chloroform/methanol (50 ml, 1:1 mixture) were placed in a 250 ml round bottom flask equipped with a condenser. The contents were refluxed while stirring in an oil bath maintained at 85° C. for 24 hours. The volatiles were removed under vacuum to obtain a waxy brownish oil, the fluorosurfactant. The fluorosurfactant was used without any further purification.

exiting the glass tube 12 is collected in glass beaker 22, which is disposed on a Mettler balance 24. The amount of fluid exiting the glass tube 12 was automatically determined by computer 26 connected to the Mettler balance 24.

The vertical sand column experiments were performed for Fluorosurfactants Nos. 1 and 2 in accordance with the following procedure. The glass tube 12 was packed with 25 g of Oklahoma No. 1 sand (SSA-2™ coarse silica flour from Halliburton Energy Services, Inc.) having a diameter of about

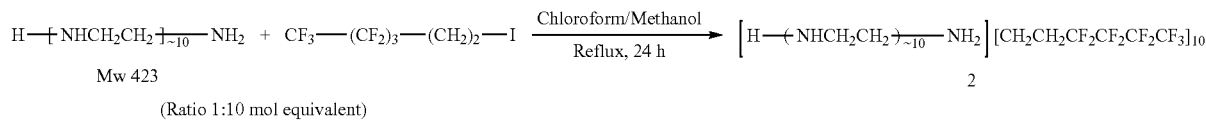

(Ratio 1:10 mol equivalent)

Contact Angle Measurements on Glass Surface

Contact angle measurements were made to determine the ability of Fluorosurfactants Nos. 1 and 2 to modify the contact angle of a surface. Aqueous fluorosurfactant solutions (0.2% by weight) of Fluorosurfactants Nos. 1 and 2 were prepared in water. A clean glass slide was immersed in these solutions and kept immersed for 5 minutes. The glass slides were removed from the solution and washed 4 times with distilled water and gently wiped with a Kim wipe. To the slide, a small drop of water was added, and the contact angle of the drop was recorded immediately. The contact angle was measured using a Rame-Hart Goniometer (Model # A-100). The contact angle of a drop of water on an untreated glass slide was also measured.

100 microns and dispersed in about 100 ml water. During these experiments, no external pressure was applied to the sand column 14. The only pressure arises from the height of the column of fluid above the sand column 14. The sand was allowed to settle for 15 minutes, and then water was drained through the glass tube 12 until the sand column 14 was just covered by water. The rate of water flow through the pack was termed the initial water flow. 100 ml of a 0.2% by weight aqueous solution of a surfactant was then added to the glass tube 12 in a manner to give minimum disturbance to the sand column 14 and this was again passed through the glass tube 12 until the last of the solution just reached the top of the sand column 14. This fluid flow was termed the Surfactant Flow. Immediately after passing this 100 ml surfactant solution, 100 ml hexane was added to the glass tube 12 giving minimum disturbance to the sand and passed through the sand column 14, again until the last of the hexane just covered the sand column 14. This was termed Hexane-1 Flow. Then, 100 ml water was added to the glass tube 12 giving minimum disturbance to the sand and this passed through the sand column 14 (again until the last of the water just covered the sand column 14). This fluid flow was termed Water-2 Flow. Thereafter, 100 ml of hexane was again passed though the sand column 14, followed by a another water flow of 100 ml, with these fluid flows terms Hexane-2 Flow and Water-3 Flow, respectively. A third hexane treatment followed by a and fourth water treatment, termed Hexane-3 Flow and Final Water Flow, respectively, were performed after the third water treatment for Fluorosurfactant No. 2.

FIG. 2 shows the data for the vertical sand column experiment above using Fluorosurfactant No. 1. As illustrated by FIG. 2, both hexane and water pass through the sand column 14 that has been treated with the fluorosurfactant. It has been observed that, if the sand column 14 is not treated with the fluorosurfactant, after passing the water in the beginning, then the hexane will not pass through the column. The results show the hexane flows are about half the corresponding water flows, for example, Hexane-1 Flow is about half Water-2 Flow. Moreover, FIG. 2 illustrates that the fluorosurfactant is progressively removed from the sand surfaces by successive water and hexane treatments.

FIG. 3 shows the data for the vertical sand column experiment above using Fluorosurfactant No. 2. As illustrated by FIG. 3, both hexane and water pass through the sand column 14 that has been treated with the fluorosurfactant. It has been observed that, if the sand column 14 is not treated with the fluorosurfactant, then the hexane will not pass through the column through which the water is passed or vice versa. The results show the hexane flows are about half the corresponding water flows, for example, Hexane-1 Flow is about half Water-2 Flow. Moreover, FIG. 3 illustrates that the fluorosurfactant is progressively removed from the sand surfaces by successive water and hexane treatments. Accordingly, Fluorosurfactant No. 2 appears to be generally as effective as Fluorosurfactant No. 1 by looking at FIGS. 2 and 3.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of or " consist of the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A treatment fluid comprising:
   a carrier fluid; and
   a cationic fluorosurfactant comprising an amine group, wherein the amine group comprises at least one substituent comprising about 3 carbons to about 22 carbons and selected from the group consisting of a fluoroalkyl group, a fluoroalkenyl group, and combinations thereof.

2. The treatment fluid of claim 1 wherein the fluorosurfactant comprises a polymeric surfactant comprising repeating nitrogens that comprise the at least one substituent.

3. The treatment fluid of claim 1 wherein the amine group is positively charged.

4. The treatment fluid of claim 1 wherein the amine group is a quaternary amine.

5. The treatment fluid of claim 1 wherein the fluorosurfactant comprises a surfactant having the following general structure:

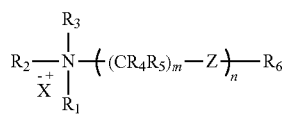

Wherein:
$R_1$ is a hydrogen atom, an alkyl group comprising about 1 to about 8 carbon atoms, or a fluoroalkyl group;
$R_2$ is a hydrogen atom, an alkyl group comprising about 1 to about 8 carbon atoms, or a fluoroalkyl group comprising about 1 to about 8 carbon atoms;
$R_3$ is a fluoroalkyl group or a fluoroalkenyl group, branched or unbranched, comprising about 3 to about 22 carbon atoms;
$R_4$ is a hydrogen atom, an alkyl group comprising about 1 to about 8 carbon atoms, or a fluoroalkyl group comprising about 1 to 8 carbon atoms;
$R_5$ is a hydrogen atom, an alkyl group comprising about 1 to about 8 carbon atoms, or a fluoroalkyl group comprising about 1 to 8 carbon atoms;
$R_6$ is a hydrogen atom, an alkyl group comprising about 1 to about 8 carbon atoms, a fluoroalkyl group comprising about 1 to about 8 carbon atoms, or $-(CR_4R_5)_m-N^+R_1R_2R_3.X^-$;
m is about 3 to about 8;
Z is either alkyl, O, NH or S;
n is about 1 to about 6; and
$X^-$ is an anion.

6. The treatment fluid of claim 1 wherein the fluorosurfactant comprises a surfactant having the following general structure:

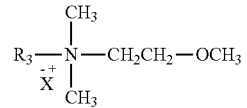

Wherein:
$R_3$ is an fluoroalkyl group that is either saturated or unsaturated comprising about 3 to about 12 carbon atoms; and
$X^-$ is an anion.

7. The treatment fluid of claim 1 wherein the fluorosurfactant comprises a surfactant having the following general structure:

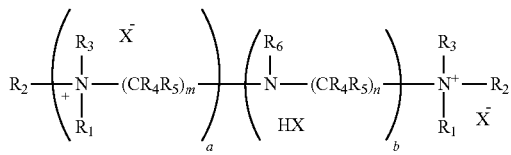

Wherein:
- $R_1$ is a hydrogen atom, an alkyl group comprising about 1 to about 8 carbon atoms, a fluoroalkyl group comprising about 1 to about 8 carbon atoms, end-capped ethylene oxide, or end-capped propylene oxide;
- $R_2$ is a hydrogen atom, an alkyl group comprising about 1 to about 8 carbon atoms, end capped ethylene oxide, or end-capped propylene oxide;
- $R_3$ is a fluoroalkyl group or a fluoroalkenyl group, branched or unbranched, comprising about 3 to about 22 carbon atoms;
- $R_4$ is a hydrogen atom, an alkyl group comprising about 1 to about 8 carbon atoms, or a fluoroalkyl group comprising about 1 to 8 carbon atoms;
- $R_5$ is a hydrogen atom, an alkyl group comprising about 1 to about 8 carbon atoms, or a fluoroalkyl group comprising about 1 to 8 carbon atoms;
- $R_6$ is a hydrogen atom, an alkyl group comprising about 1 to about 8 carbon atoms, a fluoroalkyl group comprising 3 to 22 carbon atoms, or $-(CR_4R_5)_m-N^+R_1R_2R_3 \cdot X^-$;
- m is about 1 to about 6;
- n is about 1 to about 6;
- a and b are individually from about 1 to about 200, wherein the ratio of a to b is from about 1:4 to about 4:1; and
- $X^-$ is an anion.

8. The treatment fluid of claim 1 wherein the fluorosurfactant is present in the treatment fluid in an amount of about 0.01% to about 10% by weight of the treatment fluid.

9. The treatment fluid of claim 1 wherein the fluorosurfactant comprises a reaction product of a reaction comprising polyethylene imine and perfluoroalkyl halide.

10. The treatment fluid of claim 1 wherein the substituent comprises the fluoroalkyl group and wherein the fluoroalkyl group comprises a perfluoroalkyl group.

11. The treatment fluid of claim 1 wherein the treatment fluid further comprises at least one additive selected from the group consisting of a proppant particulate, a gravel particulate, a gelling agent, a crosslinking agent, a salt, an additional surfactant, a fluid loss control additive, an acid, gas, a surface modifying agent, a tackifying agent, a foamer, a corrosion inhibitor, a scale inhibitor, a catalyst, a clay control agent, a biocide, a friction reducer, an antifoam agent, a bridging agent, a dispersant, a flocculant, $H_2S$ scavenger, $CO_2$ scavenger, an oxygen scavenger, a lubricant, a viscosifier, a breaker, a weighting agent, a relative permeability modifier, a resin, a wetting agent, and a coating enhancement agent.

12. The treatment fluid of claim 1 wherein the treatment fluid further comprises a non-fluoro surfactant in ratio of the non-fluoro surfactant to the fluorosurfactant of from about 1:99 to about 99:1.

13. The treatment fluid of claim 1 wherein the treatment fluid further comprises a non-fluoro quaternary surfactant.

14. A treatment fluid comprising:
- a carrier fluid; and
- a fluorosurfactant in an amount of about 0.01% to about 10% by weight of the treatment fluid, wherein the fluorosurfactant has the following general structure:

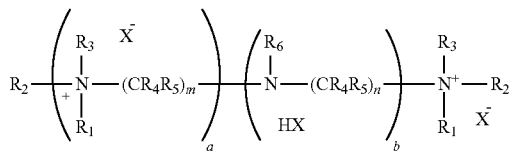

Wherein:
- $R_1$ is a hydrogen atom, an alkyl group comprising about 1 to about 8 carbon atoms, a fluoroalkyl group comprising about 1 to about 8 carbon atoms, end-capped ethylene oxide, or end-capped propylene oxide;
- $R_2$ is a hydrogen atom, an alkyl group comprising about 1 to about 8 carbon atoms, end capped ethylene oxide, or end-capped propylene oxide;
- $R_3$ is a fluoroalkyl group or a fluoroalkenyl group, branched or unbranched, comprising about 3 to about 22 carbon atoms;
- $R_4$ is a hydrogen atom, an alkyl group comprising about 1 to about 8 carbon atoms, or a fluoroalkyl group comprising about 1 to 8 carbon atoms;
- $R_5$ is a hydrogen atom, an alkyl group comprising about 1 to about 8 carbon atoms, or a fluoroalkyl group comprising about 1 to 8 carbon atoms;
- $R_6$ is a hydrogen atom, an alkyl group comprising about 1 to about 8 carbon atoms, a fluoroalkyl group comprising 3 to 22 carbon atoms, or $-(CR_4R_5)_m-N^+R_1R_2R_3 \cdot X^-$;
- m is about 1 to about 6;
- n is about 1 to about 6;
- a and b are individually from about 1 to about 200, wherein the ratio of a to b is from about 1:4 to about 4:1; and
- $X^-$ is an anion.

15. The treatment fluid of claim 14 wherein the treatment fluid further comprises at least one additive selected from the group consisting of a proppant particulate, a gravel particulate, a gelling agent, a crosslinking agent, a salt, an additional surfactant, a fluid loss control additive, an acid, gas, a surface modifying agent, a tackifying agent, a foamer, a corrosion inhibitor, a scale inhibitor, a catalyst, a clay control agent, a biocide, a friction reducer, an antifoam agent, a bridging agent, a dispersant, a flocculant, $H_2S$ scavenger, $CO_2$ scavenger, an oxygen scavenger, a lubricant, a viscosifier, a breaker, a weighting agent, a relative permeability modifier, a resin, a wetting agent, and a coating enhancement agent.

16. The treatment fluid of claim 14 wherein the treatment fluid further comprises a non-fluoro quaternary surfactant.

17. A treatment fluid comprising:
- a carrier fluid;
- a cationic fluorosurfactant comprising a positively charged amine group, wherein the amine group comprises at least one substituent comprising about 3 carbons to about 22 carbons and selected from the group consisting of a fluoroalkyl group, a fluoroalkenyl group, and combinations thereof; and
- a non-fluoro quaternary surfactant 18. The treatment fluid of claim 17 wherein the fluorosurfactant has the following general structure:

Wherein:
R$_1$ is a hydrogen atom, an alkyl group comprising about 1 to about 8 carbon atoms, or a fluoroalkyl group;
R$_2$ is a hydrogen atom, an alkyl group comprising about 1 to about 8 carbon atoms, or a fluoroalkyl group comprising about 1 to about 8 carbon atoms;
R$_3$ is a fluoroalkyl group or a fluoroalkenyl group, branched or unbranched, comprising about 3 to about 22 carbon atoms;
R$_4$ is a hydrogen atom, an alkyl group comprising about 1 to about 8 carbon atoms, or a fluoroalkyl group comprising about 1 to 8 carbon atoms;
R$_5$ is a hydrogen atom, an alkyl group comprising about 1 to about 8 carbon atoms, or a fluoroalkyl group comprising about 1 to 8 carbon atoms;
R$_6$ is a hydrogen atom, an alkyl group comprising about 1 to about 8 carbon atoms, a fluoroalkyl group comprising about 1 to about 8 carbon atoms, or —(CR$_4$R$_5$)$_m$—N$^+$R$_1$R$_2$R$_3$.X$^-$;
m is about 3 to about 8;
Z is either alkyl, O, NH or S;
n is about 1 to about 6; and
X$^-$ is an anion.

19. The treatment fluid of claim 17 wherein the fluorosurfactant has the following general structure:

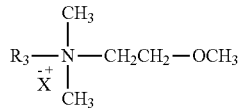

Wherein:
R$_3$ is an fluoroalkyl group that is either saturated or unsaturated comprising about 3 to about 12 carbon atoms; and
X$^-$ is an anion.

20. The treatment fluid of claim 17 wherein the fluorosurfactant has the following general structure:

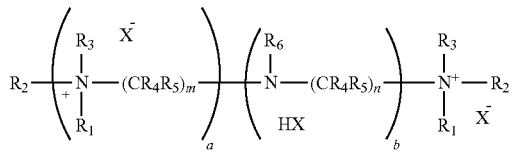

Wherein:
R$_1$ is a hydrogen atom, an alkyl group comprising about 1 to about 8 carbon atoms, a fluoroalkyl group comprising about 1 to about 8 carbon atoms, end-capped ethylene oxide, or end-capped propylene oxide;
R$_2$ is a hydrogen atom, an alkyl group comprising about 1 to about 8 carbon atoms, end capped ethylene oxide, or end-capped propylene oxide;
R$_3$ is a fluoroalkyl group or a fluoroalkenyl group, branched or unbranched, comprising about 3 to about 22 carbon atoms;
R$_4$ is a hydrogen atom, an alkyl group comprising about 1 to about 8 carbon atoms, or a fluoroalkyl group comprising about 1 to 8 carbon atoms;
R$_5$ is a hydrogen atom, an alkyl group comprising about 1 to about 8 carbon atoms, or a fluoroalkyl group comprising about 1 to 8 carbon atoms;
R$_6$ is a hydrogen atom, an alkyl group comprising about 1 to about 8 carbon atoms, a fluoroalkyl group comprising 3 to 22 carbon atoms, or —(CR$_4$R$_5$)$_m$—N$^+$R$_1$R$_2$R$_3$.X$^-$;
m is about 1 to about 6;
n is about 1 to about 6;
a and b are individually from about 1 to about 200, wherein the ratio of a to b is from about 1:4 to about 4:1; and
X$^-$ is an anion.

* * * * *